(12) United States Patent
Park et al.

(10) Patent No.: US 9,557,771 B2
(45) Date of Patent: Jan. 31, 2017

(54) ELECTRONIC DEVICE INCLUDING FLEXIBLE DISPLAY

(71) Applicant: Samsung Electronics Co., Ltd., Gyeonggi-do (KR)

(72) Inventors: Jihoon Park, Gyeonggi-do (KR); Jonghae Kim, Seoul (KR); Chungkeun Yoo, Gyeonggi-do (KR); Youngsun Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/734,223

(22) Filed: Jun. 9, 2015

(65) Prior Publication Data

US 2015/0366089 A1  Dec. 17, 2015

(30) Foreign Application Priority Data

Jun. 11, 2014  (KR) ........................ 10-2014-0070813

(51) Int. Cl.
*G06F 1/16* (2006.01)

(52) U.S. Cl.
CPC .......... *G06F 1/1652* (2013.01); *G06F 1/1641* (2013.01); *E05Y 2900/606* (2013.01)

(58) Field of Classification Search
None
See application file for complete search history.

(56) References Cited

U.S. PATENT DOCUMENTS

| | | | | |
|---|---|---|---|---|
| 5,734,513 A * | 3/1998 | Wang | ................... | G02B 25/002 345/32 |
| 5,949,643 A * | 9/1999 | Batio | ................... | G06F 1/1616 345/168 |
| 6,377,324 B1 * | 4/2002 | Katsura | ............ | G02F 1/133305 349/58 |
| 6,577,496 B1 * | 6/2003 | Gioscia | ................. | G06F 1/1616 345/156 |
| 6,628,244 B1 * | 9/2003 | Hirosawa | .............. | G06F 1/1626 345/1.1 |
| 7,324,093 B1 * | 1/2008 | Gettemy | ............... | G06F 1/1622 178/18.01 |
| 7,433,179 B2 * | 10/2008 | Hisano | ................. | G06F 1/1616 345/156 |
| 7,565,720 B1 * | 7/2009 | Ligtenberg | ............ | G06F 1/1681 16/366 |
| 7,777,415 B2 * | 8/2010 | Yang | ................... | H01L 51/5237 313/504 |
| 7,880,688 B2 * | 2/2011 | Silverbrook | ........... | G06Q 50/00 345/1.3 |

(Continued)

FOREIGN PATENT DOCUMENTS

KR  10-2012-0016873 A  2/2012
KR  10-2012-0083804 A  7/2012

*Primary Examiner* — Courtney Smith
*Assistant Examiner* — Rashen E Morrison
(74) *Attorney, Agent, or Firm* — Cha & Reiter, LLC

(57) ABSTRACT

An electronic device is provided including: a flexible display; a first housing member; a second housing member; a hinge module coupled to the first housing member and the second housing member; and a support body disposed between the flexible display and the first and second housing members, wherein the second housing member is adapted to pivot about the hinge module relative to the first housing member.

6 Claims, 16 Drawing Sheets

(56) References Cited

U.S. PATENT DOCUMENTS

| | | | | |
|---|---|---|---|---|
| 8,125,759 B2* | 2/2012 | Fukuma | ............... | F16G 13/18 |
| | | | | 248/349.1 |
| 8,228,667 B2* | 7/2012 | Ma | ............... | G06F 1/1652 |
| | | | | 361/679.01 |
| 8,271,047 B2* | 9/2012 | Kim | ............... | G06F 1/1615 |
| | | | | 345/156 |
| 8,369,075 B2* | 2/2013 | Huang | ............... | G09F 9/33 |
| | | | | 248/297.21 |
| 8,605,421 B2* | 12/2013 | Verschoor | ............... | G06F 1/1652 |
| | | | | 361/679.21 |
| 8,624,844 B2* | 1/2014 | Behar | ............... | G06F 1/162 |
| | | | | 345/168 |
| 8,662,731 B2* | 3/2014 | Wang | ............... | G09F 9/30 |
| | | | | 349/61 |
| 8,971,032 B2* | 3/2015 | Griffin | ............... | G06F 1/1616 |
| | | | | 345/156 |
| 9,013,864 B2* | 4/2015 | Griffin | ............... | H04M 1/0216 |
| | | | | 16/382 |
| 9,204,565 B1* | 12/2015 | Lee | ............... | E05D 7/00 |
| 2006/0146488 A1* | 7/2006 | Kimmel | ............... | G06F 1/1616 |
| | | | | 361/679.04 |
| 2012/0044620 A1* | 2/2012 | Song | ............... | G06F 1/1616 |
| | | | | 361/679.01 |
| 2012/0182677 A1* | 7/2012 | Seo | ............... | H04B 1/385 |
| | | | | 361/679.01 |
| 2012/0264489 A1* | 10/2012 | Choi | ............... | H04M 1/0216 |
| | | | | 455/566 |
| 2013/0021762 A1* | 1/2013 | van Dijk | ............... | G06F 1/1652 |
| | | | | 361/749 |
| 2014/0042293 A1* | 2/2014 | Mok | ............... | G06F 1/1652 |
| | | | | 248/682 |
| 2014/0111954 A1* | 4/2014 | Lee | ............... | G06F 1/1641 |
| | | | | 361/749 |

\* cited by examiner

FIG. 3
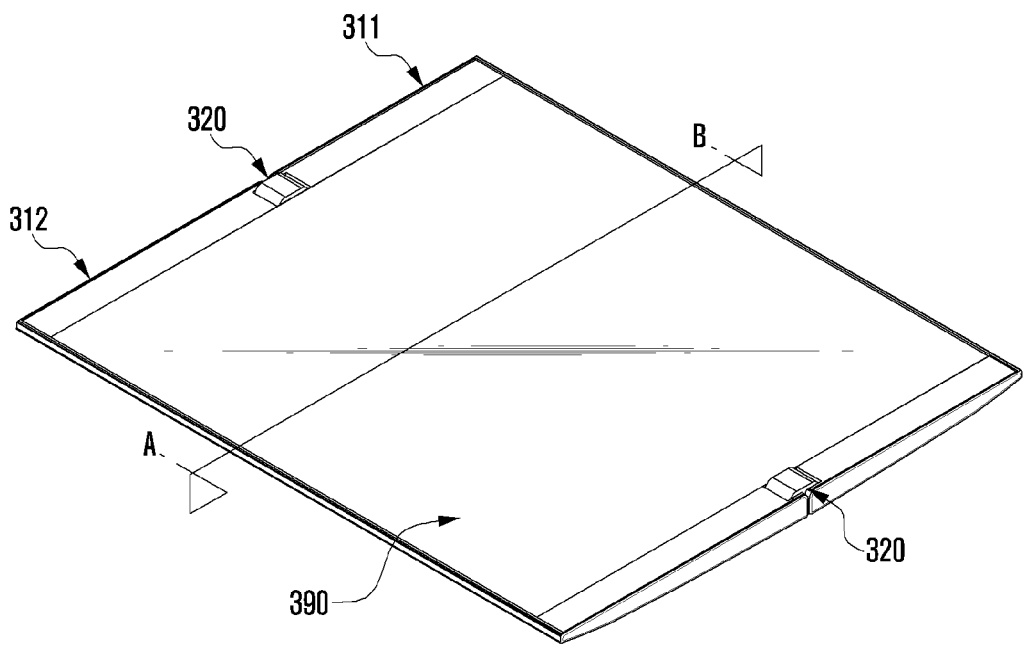
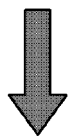
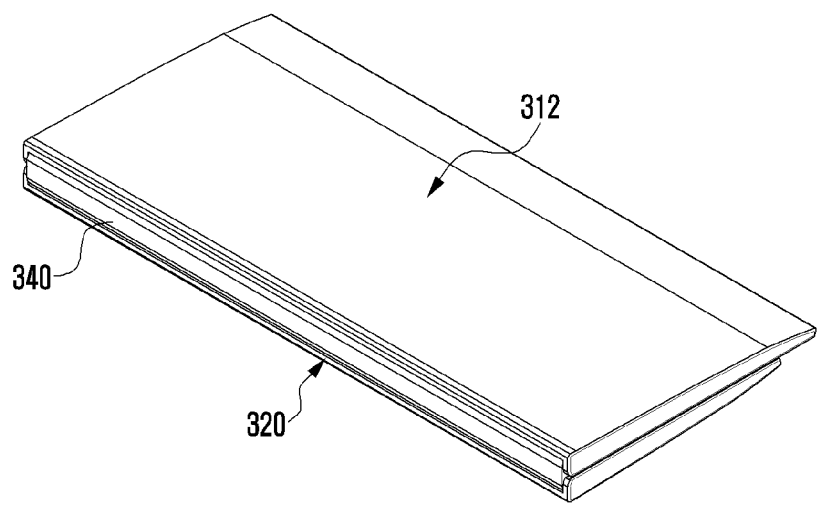

ELECTRONIC DEVICE INCLUDING FLEXIBLE DISPLAY

CLAIM OF PRIORITY

The present application is related to and claims priority from and the benefit under 35 U.S.C. §119(a) of Korean Patent Application No. 10-2014-0070813, filed on Jun. 11, 2014, which is hereby incorporated by reference for all purposes as if fully set forth herein.

BACKGROUND

1. Field of the Invention

Various embodiments of the present disclosure relate to an electronic device having a flexible display and, more specifically, to an internal structure of an electronic device that can receive a bent portion of a flexible display when the flexible display is bent.

2. Description of the Prior Art

With the development of electronic technologies, various types of display devices have been developed. In particular, display devices, such as TVs, PCs, lap-top computers, tablet PCs, mobile phones, MP3 players, and the like, have been widely used in most homes.

Recently, in order to meet user demand for a variety of new functions, efforts have been made to develop new types of display devices. For example, there is a flexible display. The flexible display refers to a display device that may be deformed like paper, as opposed to the generally used flat panel displays.

The flexible display device may be used for various applications because the flexible display device can be bent and deformed under the force applied by a user. For example, the flexible display device may be implemented as a portable device such as a mobile phone, a tablet PC, an electronic picture frame, a PDA, an MP3 player, or the like.

SUMMARY

According to aspects of the disclosure, an electronic device is provided comprising: a flexible display; a first housing member; a second housing member; a hinge module coupled to the first housing member and the second housing member; and a support body disposed between the flexible display and the first and second housing members, wherein the second housing member is adapted to pivot about the hinge module relative to the first housing member.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a perspective view of an electronic device according to a first embodiment of the present disclosure;

DETAILED DESCRIPTION

Figure 1:
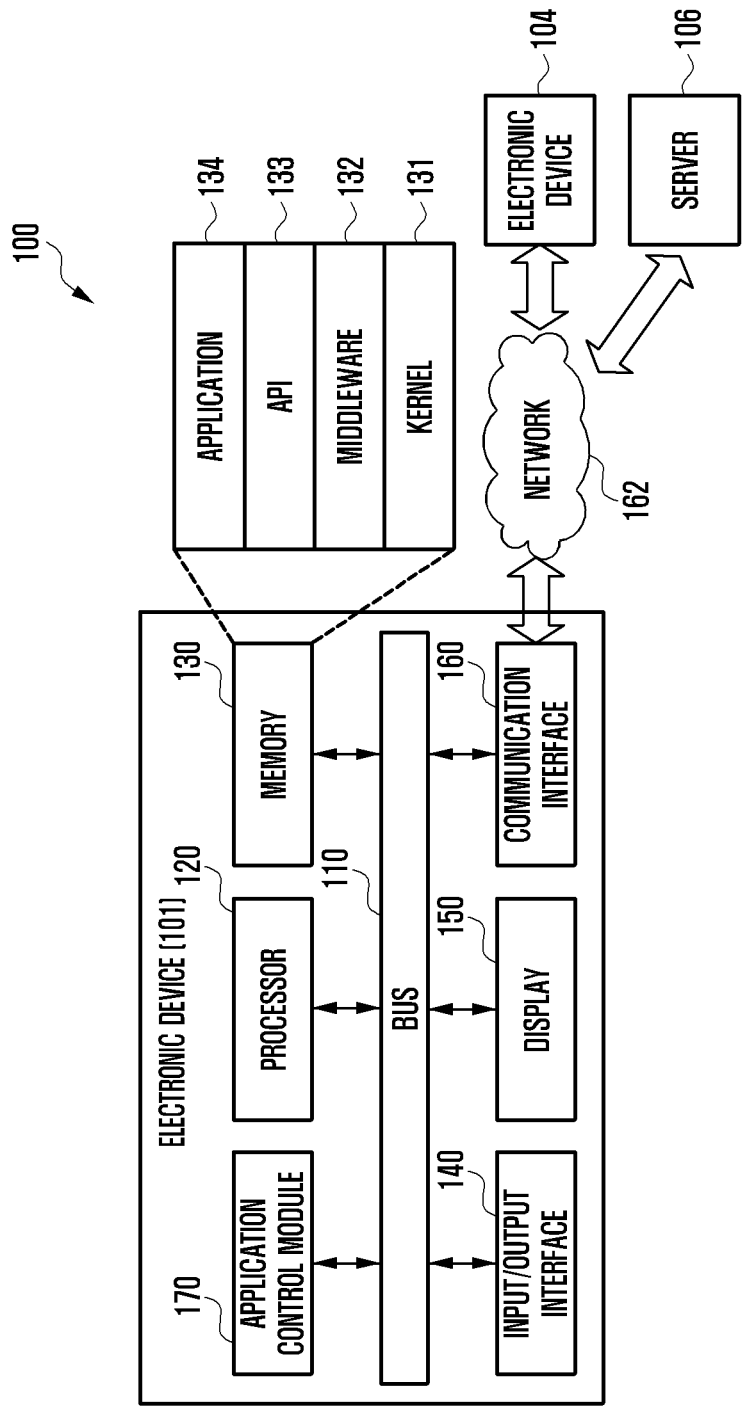
FIG. 1 is a diagram of an example of a network environment including an electronic device according to various embodiments of the present disclosure.

Hereinafter, the present disclosure will be described with reference to the accompanying drawings. The present disclosure may have various embodiments, and modifications and changes may be made therein. Therefore, the present invention disclosure will be described in detail with reference to particular embodiments shown in the accompanying drawings. However, it should be understood that there is no intent to limit the present disclosure to the particular forms, and the present disclosure should be construed to cover all modifications, equivalents, and/or alternatives falling within the spirit and scope of the present disclosure. In describing the drawings, similar elements are designated by similar reference numerals.

As used in the present disclosure, the expression "include" or "may include" or "can include" refers to the existence of a corresponding function, operation, or constituent element, and does not limit one or more additional functions, operations, or constituent elements. Further, as used in the present disclosure, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present disclosure, the expression "and/or" includes any or all combinations of words enumerated together. For example, the expression "A or B" or "at least one of A and B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present invention disclosure are merely for the purpose of describing particular embodiments and are not intended to limit the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Herein, the term "color-blind" is used to refer to a person with any color-vision-deficiency. Herein, "correcting" a color-blind condition or like phrase refers to improving the ability of the person to see a colored object or to distinguish between objects of different colors.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, electronic tattoos, an electronic appcessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, robot, an automatic teller machine of financial institutions, or point of sales of stores.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. Further, the electronic device according to the present disclosure may be a flexible device. It is noted that the above-mentioned electronic devices are exemplary only and not to be considered as a limitation of this disclosure.

Hereinafter, an electronic device according to various embodiments of the present disclosure will be discussed with reference to the accompanying drawings. The term "a user" as used in various embodiments may refer to any person who uses an electronic device or any other device (e.g., an artificial intelligence electronic device) using an electronic device.

FIG. 1 is a diagram of an example of a network environment 100 including therein an electronic device 101 in accordance with an embodiment of the present disclosure. The electronic device 101 may include, but not limited to, a bus 110, a processor 120, a memory 130, an input/output interface 140, a display 150, a communication interface 160, and an application control module 170.

The bus 110 may be a circuit designed for connecting the above-discussed elements and communicating data (e.g., a control message) between such elements.

The processor 120 may receive commands from the other elements (e.g., the memory 130, the input/output interface 140, the display 150, the communication interface 160, or the application control module 170, etc.) through the bus 110, interpret the received commands, and perform the arithmetic or data processing based on the interpreted commands.

The memory 130 may store therein commands or data received from or created at the processor 120 or other elements (e.g., the input/output interface 140, the display 150, the communication interface 160, or the application control module 170, etc.). The memory 130 may include programming modules such as a kernel 131, a middleware 132, an application programming interface (API) 133, and an application 134. Each of the programming modules may be composed of software, firmware, hardware, and any combination thereof.

The kernel 131 may control or manage system resources (e.g., the bus 110, the processor 120, or the memory 130, etc.) used for performing operations or functions of the other programming modules, e.g., the middleware 132, the API 133, or the application 134. Additionally, the kernel 131 may offer an interface that allows the middleware 132, the API 133 or the application 134 to access, control or manage individual elements of the electronic device 101.

The middleware 132 may perform intermediation by which the API 133 or the application 134 communicates with the kernel 131 to transmit or receive data. Additionally, in connection with task requests received from the applications 134, the middleware 132 may perform a control (e.g., scheduling or load balancing) for the task request by using technique such as assigning the priority for using a system resource of the electronic device 101 (e.g., the bus 110, the processor 120, or the memory 130, etc.) to at least one of the applications 134.

The API 133, which is an interface for allowing the application 134 to control a function provided by the kernel 131 or the middleware 132, may include, for example, at least one interface or function (e.g., a command) for a file control, a window control, an image processing, a text control, and the like.

According to embodiments, the application 134 may include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 134 may be an application associated with an exchange of information between the electronic device 101 and any external electronic device (e.g., an external electronic device 104). This type application may include a notification relay application for delivering specific information to an external electronic device, or a device management application for managing an external electronic device.

For example, the notification relay application may include a function to deliver notification information created at any other application of the electronic device 101 (e.g., the SMS/MMS application, the email application, the health care application, or the environment information application, etc.) to an external electronic device (e.g., the electronic device 104). Additionally or alternatively, the notification relay application may receive notification information from an external electronic device and offer it to a user. The device management application may manage (e.g., install, remove or update) a certain function (a turn-on/turn-off of an external electronic device (or some components thereof), or an adjustment of brightness (or resolution) of a display) of any external electronic device communicating with the electronic device 101, a certain application operating at such an external electronic device, or a certain service (e.g., a call service or a message service) offered by such an external electronic device.

According to embodiments, the application 134 may include a specific application specified depending on attributes (e.g., a type) of an external electronic device (e.g., the electronic device 104). For example, in case an external electronic device is an MP3 player, the application 134 may include a specific application associated with a play of music. Similarly, in case an external electronic device is a portable medical device, the application 134 may include a specific application associated with a health care. In an embodiment, the application 134 may include at least one of an application assigned to the electronic device 101 or an application received from an external electronic device (e.g., the server 106 or the electronic device 104).

The input/output interface 140 may deliver commands or data, entered by a user through an input/output unit (e.g., a sensor, a keyboard, or a touch screen), to the processor 120, the memory 130, the communication interface 160, or the application control module 170 via the bus 110. For example, the input/output interface 140 may offer data about a user's touch, entered through the touch screen, to the processor 120. Also, through the input/output unit (e.g., a speaker or a display), the input/output interface 140 may output commands or data, received from the processor 120, the memory 130, the communication interface 160, or the application control module 170 via the bus 110. For example, the input/output interface 140 may output voice data, processed through the processor 120, to a user through the speaker.

The display 150 may display thereon various types of information (e.g., multimedia data, text data, etc.) to a user.

The communication interface 160 may perform a communication between the electronic device 101 and any external electronic device (e.g., the electronic device 104 of the server 106). For example, the communication interface 160 may communicate with any external device by being connected with a network 162 through a wired or wireless communication. A wireless communication may include, but not limited to, at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). A wired communication may include, but not limited to, at least one of USB (Universal Serial Bus), HDMI (High Definition Multimedia Interface), RS-232 (Recommended Standard 232), or POTS (Plain Old Telephone Service).

According to an embodiment, the network 162 may be a communication network, which may include at least one of a computer network, an internet, an internet of things, or a telephone network. According to an embodiment, a protocol (e.g., transport layer protocol, data link layer protocol, or physical layer protocol) for a communication between the electronic device 101 and any external device may be supported by at least one of the application 134, the API 133, the middleware 132, the kernel 131, or the communication interface 160.

The application control module 170 may process at least part of information obtained from the other elements (e.g., the processor 120, the memory 130, the input/output interface 140, or the communication interface 160, etc.) and then offer it to a user in various ways. For example, the application control module 170 may recognize information about access components equipped in the electronic device 101, store such information in the memory 130, and execute the application 134 on the basis of such information.

Figure 2:
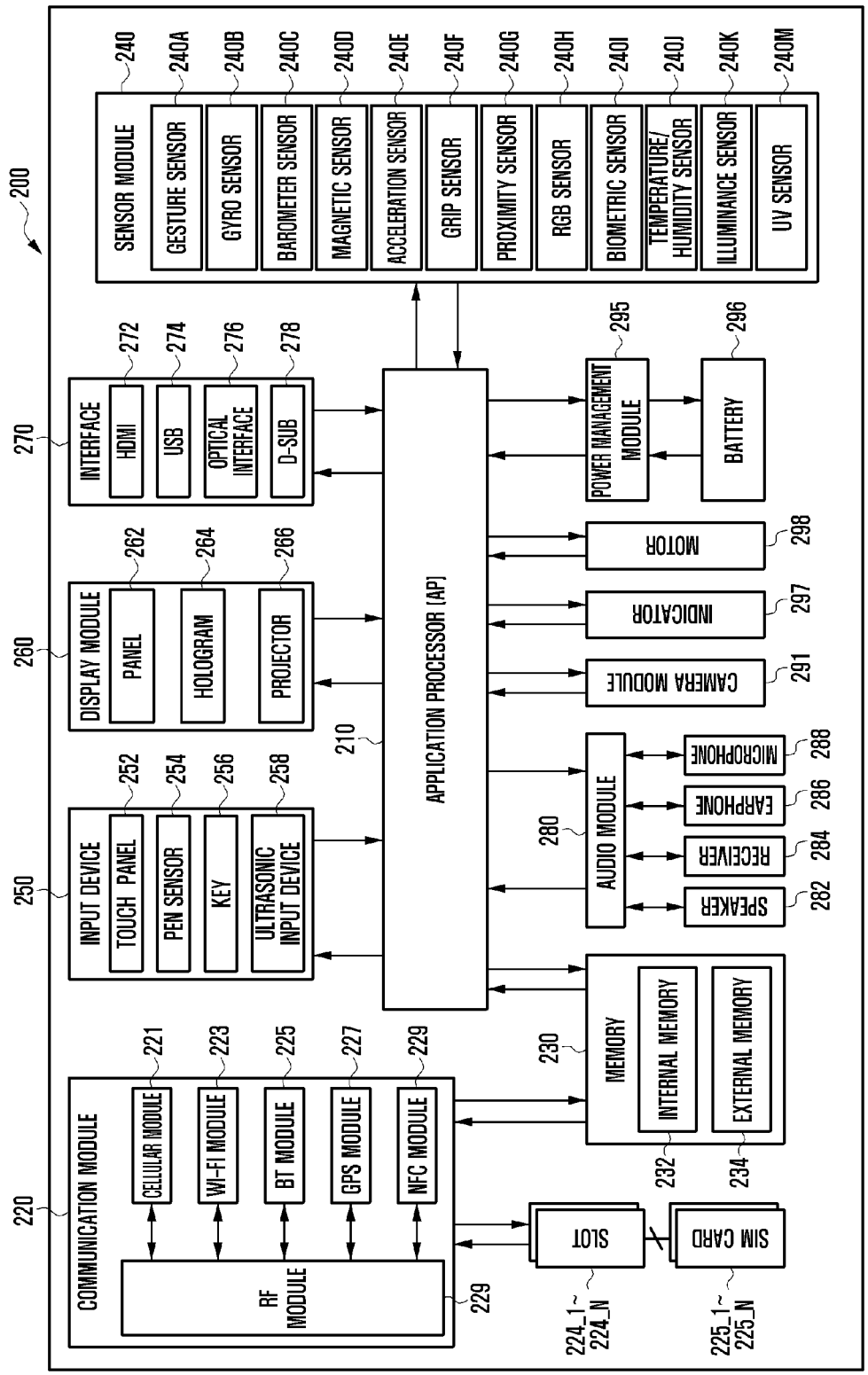
FIG. 2 is a block diagram of an example of an electronic device according to various embodiments of the present disclosure.

FIG. 2 is a block diagram of an example of an electronic device 201 in accordance with an embodiment of the present disclosure. The electronic device 201 may form, for example, the whole or part of the electronic device 101 shown in FIG. 1. Electronic device 201 may include at least one application processor (AP) 210, a communication module 220, a subscriber identification module (SIM) card 224, a memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The communication module 220 (e.g., the communication interface 160) may perform data communication with any other electronic device (e.g., the electronic device 104 or the server 106) connected to the electronic device 200 (e.g., the electronic device 101) through the network. According to an embodiment, the communication module 220 may include therein a cellular module 221, a WiFi module 223, a BT module 225, a GPS module 227, an NFC module 228, and an RF (Radio Frequency) module 229.

The cellular module 221 may support a voice call, a video call, a message service, an internet service, or the like call through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of functions the AP 210 can provide. For example, the cellular module 221 may perform at least part of a multimedia control function.

According to an embodiment, the cellular module 221 may include a communication processor (CP). Additionally, the cellular module 221 may be formed of SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transceiver, a PAM (Power Amp Module), a frequency filter, an LNA (Low Noise Amplifier), or the like. Also, the RF module 229 may include any component, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224_1 to 224_N may be a specific card formed of SIM and may be inserted into a slot 225_1 to 225_N formed at a certain place of the electronic device. The SIM card 224_1 to 224_N may contain therein an ICCID (Integrated Circuit Card IDentifier) or an IMSI (International Mobile Subscriber Identity).

The memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 200 through various interfaces. According to an embodiment, the electronic device 200 may further include a storage device or medium such as a hard drive.

The sensor module 240 may measure physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 150) may include a panel 262, a hologram 264, or a projector 266. The panel 262 may be, for example, LCD (Liquid Crystal Display), AM-OLED (Active Matrix Organic Light Emitting Diode), or the like. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

The interface 270 may include, for example, an HDMI (High-Definition Multimedia Interface) 272, a USB (Universal Serial Bus) 274, an optical interface 276, or a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or a microphone 288.

The camera module 291 is a device capable of obtaining still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage electric power of the electronic device 200. Although not shown, the power management module 295 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 296 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

An electronic device, according to various embodiments of the present disclosure, may include: a first housing; a second housing; and a hinge module that interconnects the first and second housings to allow the same to be opened or closed with respect to each other in a folding manner. The hinge module is connected to the first and second housings such that the second housing rotates between preset first and second locations with respect to the first housing. The first location may refer to a state in which a flexible display is folded, and the second location may refer to a state in which the flexible display is unfolded to form a flat surface.

While the first and second housings are unfolded away from each other, one surface of the first housing and one surface of the second housing may form a flat surface. The electronic device may further include a display unit and a support body for supporting the display unit. The display unit may be disposed on the first and second housings and may be exposed to the outside. The display unit may be exposed to the outside while the first and second housings are unfolded away from each other, but may be received in the interior of the electronic device while the first and second housings are folded toward each other. The support body may be disposed such that the display unit is located on one surface thereof, and the first and second housings are located on the opposite surface thereof, thereby supporting the display unit.

The support body may be connected to the first and second housings. The support body may be mounted to the first and second housings to rotate and move in a predetermined range of angles and lengths.

The display unit may be a flexible display, a portion of which can be continuously bent in the process in which the first and second housings are folded toward each other.

The support body may include a resilient member. When the first and second housings are folded toward each other, the display unit, which is a flexible display, may form a bent portion that is continuously bent. The resilient member of the support body may be bent to support the bent portion while surrounding the bent portion. The support body may be continuously bent to correspond to the bent portion of the resilient member. The resilient member may be a plate-shaped member that has a flexible resilience and a restoring force that maintains the flatness through the resilience.

While the first and second housings are open with respect to each other (e.g., are unfolded away from each other), the support body may be unfolded to be flat. When the support body is unfolded, the resilient member may also be unfolded. The support body, while being unfolded, may support the rear surface of the display unit.

Hereinafter, specific embodiments among the various embodiments of the present disclosure will be described.

Figure 4:
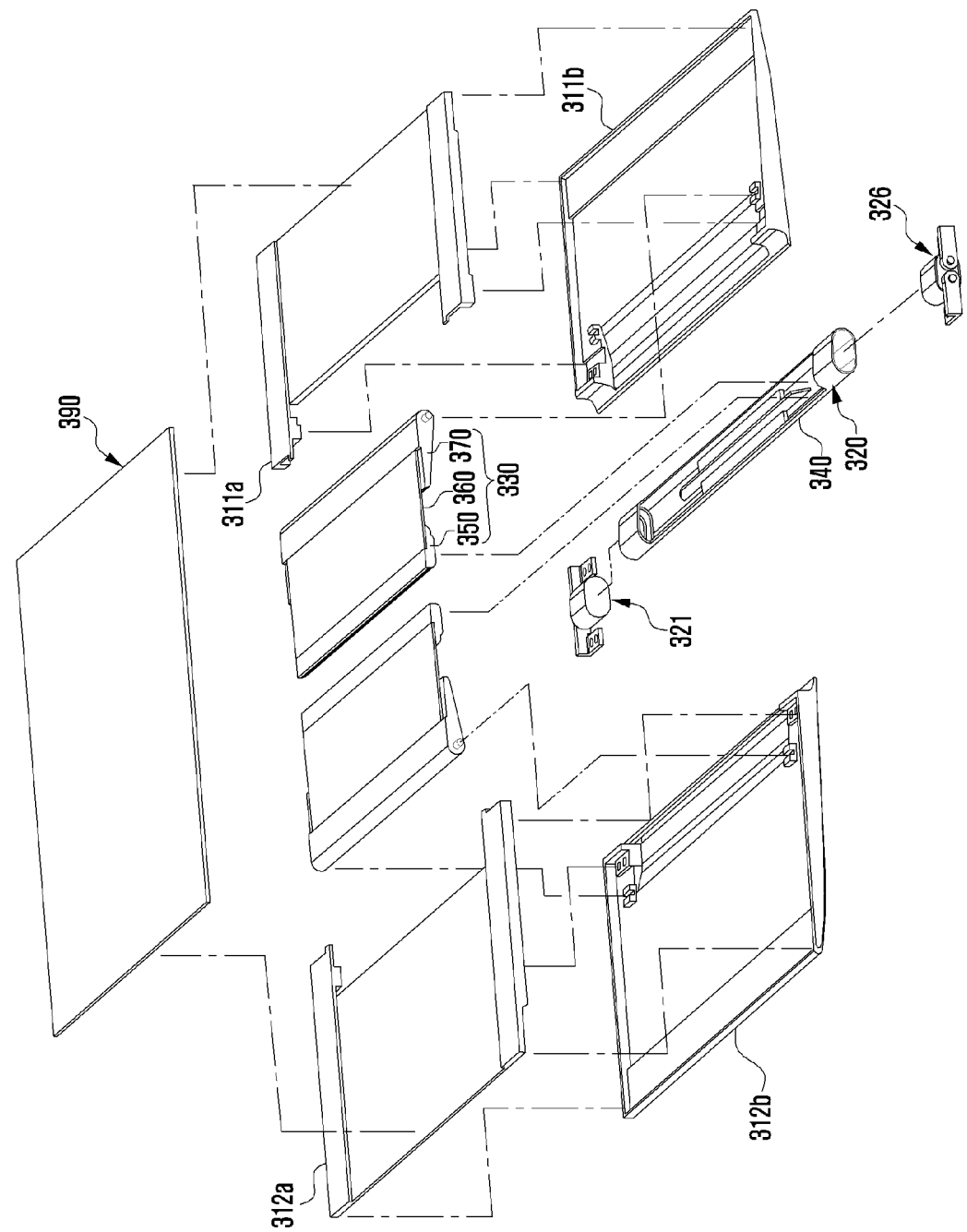
FIG. 4 is an exploded perspective view of the electronic device according to the first embodiment of the present disclosure.
Figure 5:
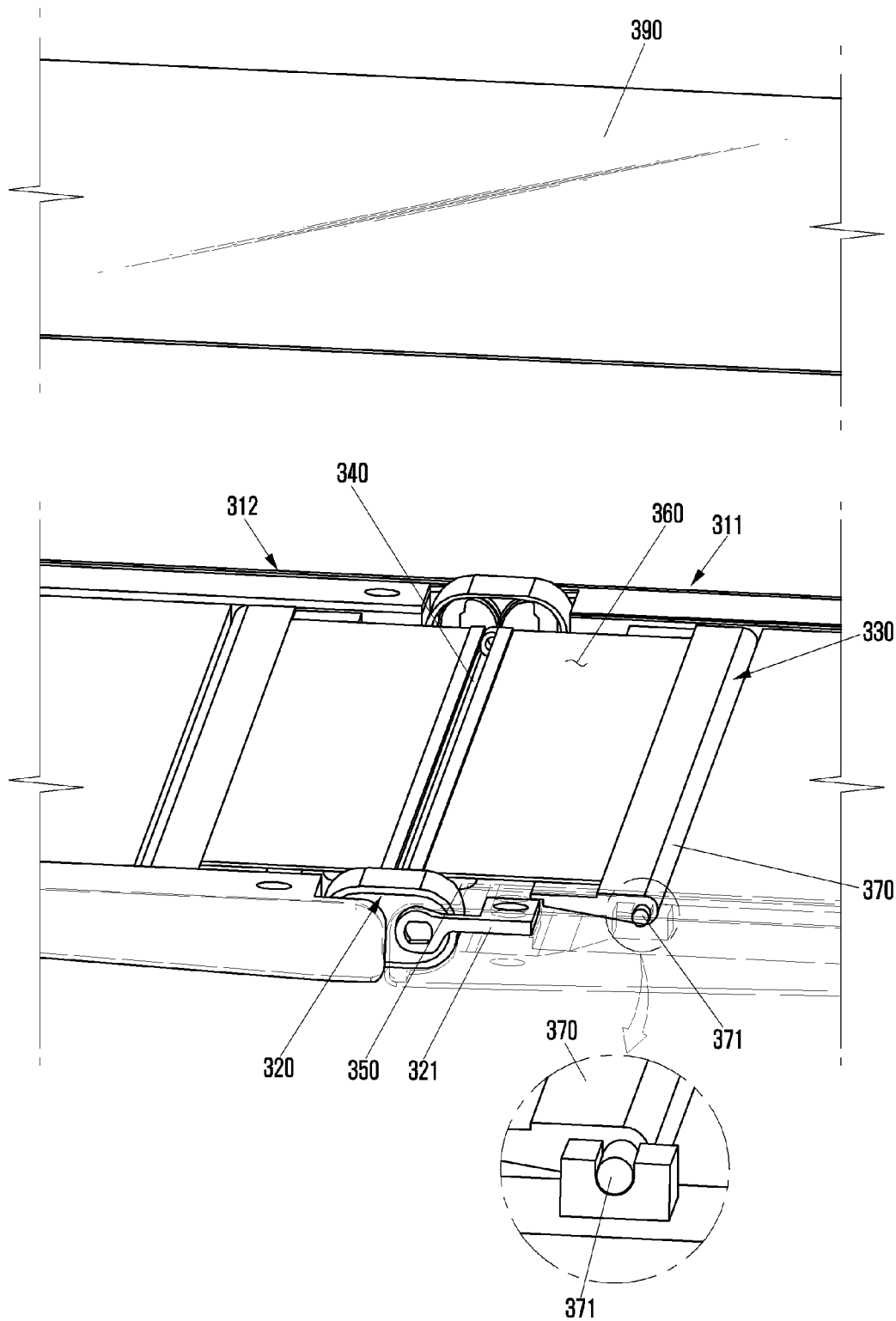
FIG. 5 is a perspective view of the electronic device, according to the first embodiment of the present disclosure, with a flexible display separated.
Figure 6:
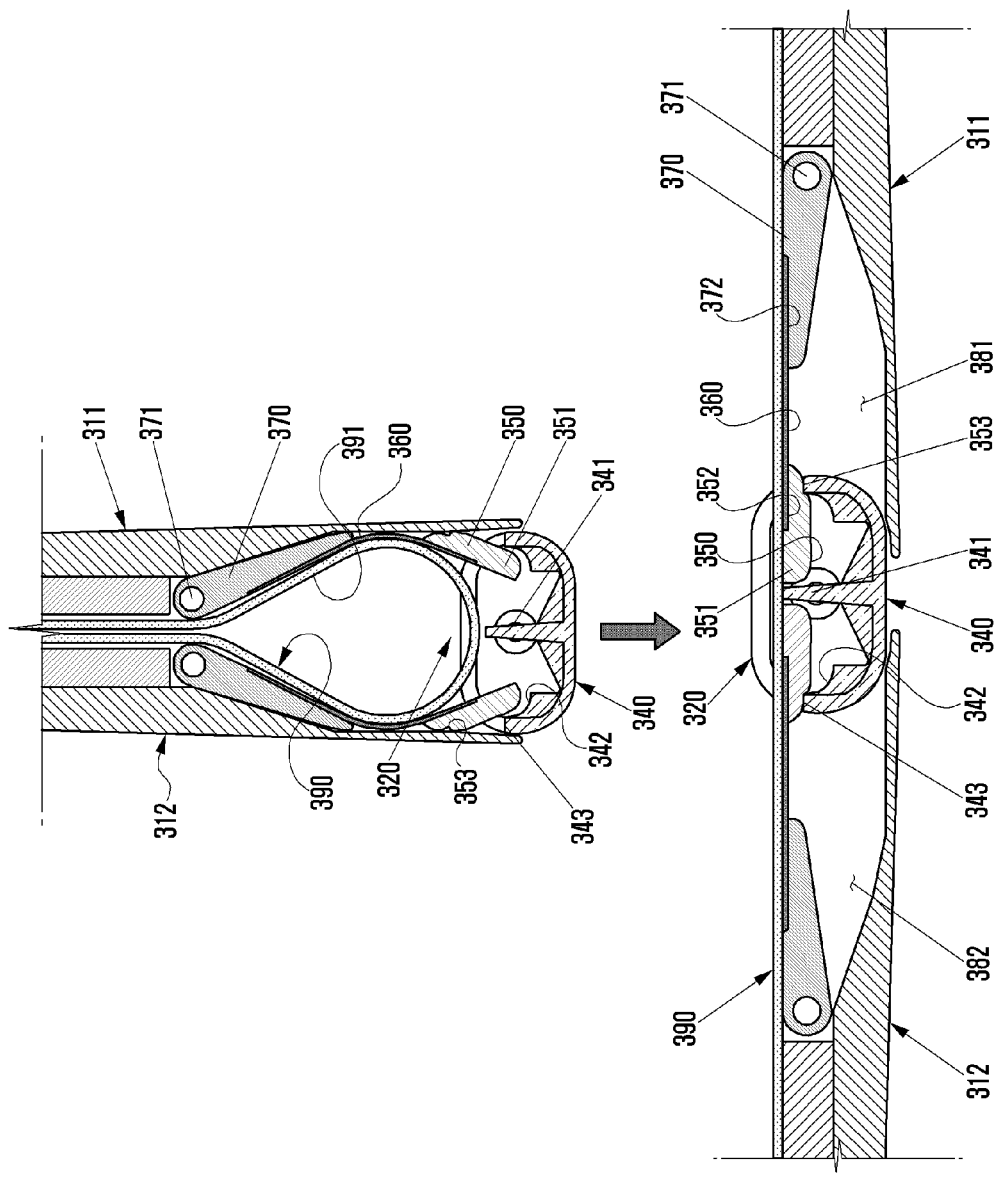
FIG. 6 is a sectional view taken along line A-B of FIG. 3.

FIG. 3 is a perspective view of an electronic device according to a first embodiment of the present disclosure. FIG. 4 is an exploded perspective view of the electronic device according to the first embodiment of the present disclosure. FIG. 5 is a perspective view of the electronic device, according to the first embodiment of the present disclosure, with a flexible display separated. FIG. 6 is a sectional view of the electronic device, according to the first embodiment of the present disclosure, taken along line A-B of FIG. 3.

The electronic device, according to the first embodiment of the present disclosure, includes a first housing member 311, a second housing member 312, and a hinge module 320. The hinge module 320 may include a support frame 340 that makes up a longitudinal body of the hinge module 320.

The first housing member 311 and the second housing member 312 may pivot toward each other about the hinge module 320. A flexible display 390 may be located on a surface of the first and second housing members.

The first housing member 311 may include an inner housing member 311a brought into contact with a portion of the rear surface of the flexible display 390 and an outer housing member 311b forming the peripheral region of the first housing member 311. The second housing member 312 may also include an inner housing member 312a brought into contact with a portion of the rear surface of the flexible display 390 and an outer housing member 312b forming the peripheral region of the second housing member 312.

As illustrated in FIG. 6, the support frame 340 may include a central support 341 formed in the longitudinal direction of the support frame 340 to protrude toward the flexible display 390, curved slide surfaces 342 formed on opposite end portions thereof, which have a groove shape of a predetermined curvature, and step portions 343, each having a surface extending from each curved slide surface 342 toward the outside of the support frame 340.

The electronic device includes support bodies 330, each being disposed such that the flexible display 390 is located on one surface thereof and the first or second housing member is located on the opposite surface thereof. The support bodies 330 may support the flexible display 390.

The support bodies 330 may be coupled, at one end portion thereof, to the first housing member 311 and the second housing member 312, respectively.

The first and second housing members may be coupled to the hinge module 320 and may be arranged to pivot towards (or away from) one another.

Each of the support bodies 330 may include a first support member 350, a second support member 360, and a third support member 370. The first support members 350, the second support members 360, and the third support members 370 may be symmetrically located on the opposite ends of the hinge module 320.

The first support member 350 may slide while being brought into contact with the support frame 340.

The first support member 350 includes a stopper 353 formed on one end portion thereof. The second support member 360 is a plate-shaped member and may be a resilient member having resilience. The second support member 360 may be formed of an elastic material. The first support member 370 and the third support members 350 may be coupled to opposite ends of the second support member 360.

When the electronic device is unfolded, the support members 350-370 may be aligned to form a substantially flat surface for supporting the rear surface of the flexible display 390.

When the electronic device is folded, the second support member 360 may be bent to support a bend 391 of the flexible display 390.

The second support member 360 may be located between the first support member 350 and the third support member 370.

The third support member 370 may include a step 372 to which the second support member 360 is coupled. The step 372 may have a height equal to the thickness of the second support member 360 so that the second support member 360 and the third support member 370 may be coplanar with each other. The first support member 350 and the second support member 360 may also be coplanar with each other. When the electronic device is unfolded, the flexible display 390 may be supported by one substantially flat surface formed by the support members 350, 360, and 370.

Each third support member 370 may be coupled to the first or second housing members.

The third support member 370 may include pin-joint coupling parts 371 disposed on opposite ends of the third support member 370. The third support member 370 may be jointly coupled to the first or second housing member through the pin-joint coupling parts 371 to freely rotate with respect to the first or second housing member in a predetermined range of acute angles.

The pin-joint coupling between the third support member 370 and the first or second housing member may be made through the inner surface of the first or second housing member.

FIG. 6 depicts the electronic device in a folded state and unfolded state. When the electronic device is folded, a bend 391 may be formed in the flexible display 390. When the bend 391 applies a force to the second support member 360, this force causes second support member 360 to also bend. At this time, the third support member 370 rotates in a predetermined range of angles since the third support member 370 is coupled to the first or second housing member through the pin-joint coupling parts.

The second support member 360 may be coupled to a step 352 of the first support member 350.

While the electronic device is folded, one end portion 351 of the first support member 350 may come in contact with the curved slide surface 342 of the support frame 340.

The second support member 360 may be bent to support the bend 391 of the flexible display 390.

Although the third support member 370 may rotate within a predetermined range, the movement thereof is restricted. However, the first support member 350 is movable because the end portion 351 thereof is not secured to a separate element. Accordingly, while the electronic device is being folded, the third support member 370 rotates in the predetermined range, and the first support member 350 moves while rotating. Since the first support member 350 can move in a predetermined range, the support body 330 is not damaged even though a portion of the support body 330 is bent. The support members 350, 360, and 370 may support the bend 391 while surrounding the same.

Receiving spaces 381 and 382 for receiving the bend 391 and the support bodies 330 are required inside the flexible display 390. With the receiving spaces 381 and 382 minimized, the internal spaces of the first housing member 311 and the second housing member 312 may be minimized.

While the electronic device is being unfolded, the stopper 353 of the first support member 350 may come in contact with the step portion 343 of the support frame 340. When the stopper 353 is stopped by the step portion 343, the first support member 350 may be brought close to the support frame 340 by the resilience of the flexible display 390 and the second support member 360.

The surface formed by the support members 350, 360, and 370 may support the rear surface of the flexible display 390.

When the electronic device is unfolded, the support members 350, 360, and 370 may interlock to form a substantially flat surface that is adapted to support the flexible display 390. In some aspects, the substantially flat surface, for example, may include various grooves at locations where any two of the support members 350, 360, and 370 meet. Additionally or alternatively, in some implementations, at least two of the support members 350, 360, 370, may be positioned at a slight angle (e.g., 0-10°) relative to one another while forming the substantially flat surface.

In addition, the central support 341 of the support frame 340 may also support the flexible display 390. While the bend 391 is straightened, the entire region of the flexible display 390 where the bend 391 forms may be supported by the support bodies 330.

According to aspects of the disclosure, when the electronic device is being folded/unfolded, the first support member 350 may be guided and supported by the curved slide surface 342.

Figure 7A:
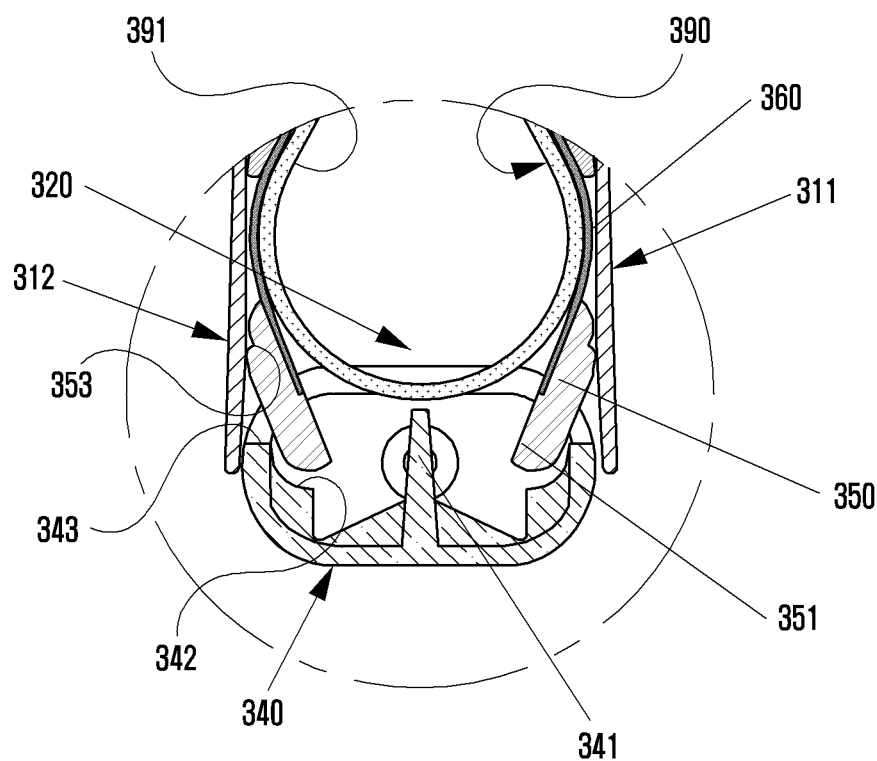
FIG. 7A, FIG. 7B, and FIG. 7C are diagrams illustrating the operation of the electronic device according to the first embodiment of the present disclosure.
Figure 7B:
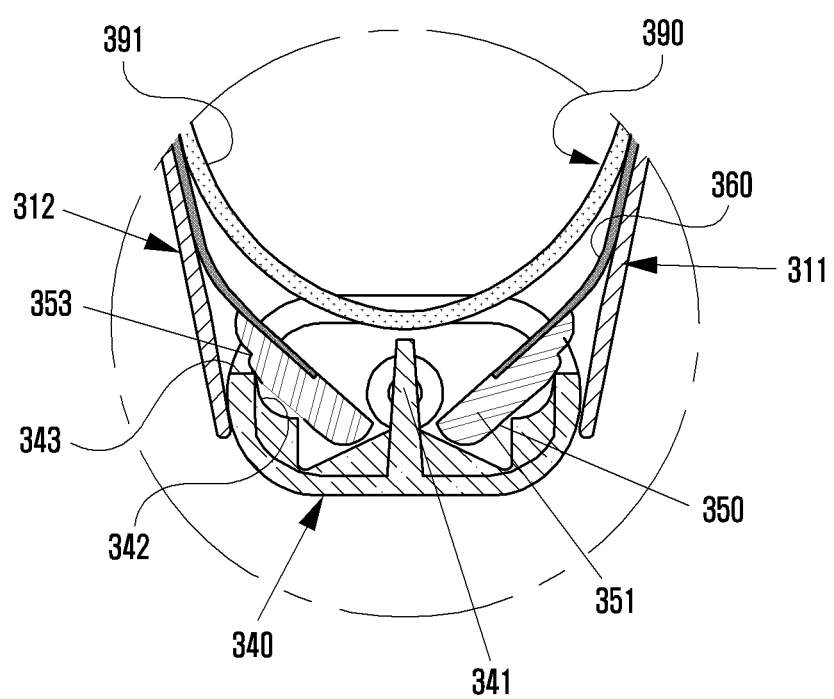
Figure 7C:
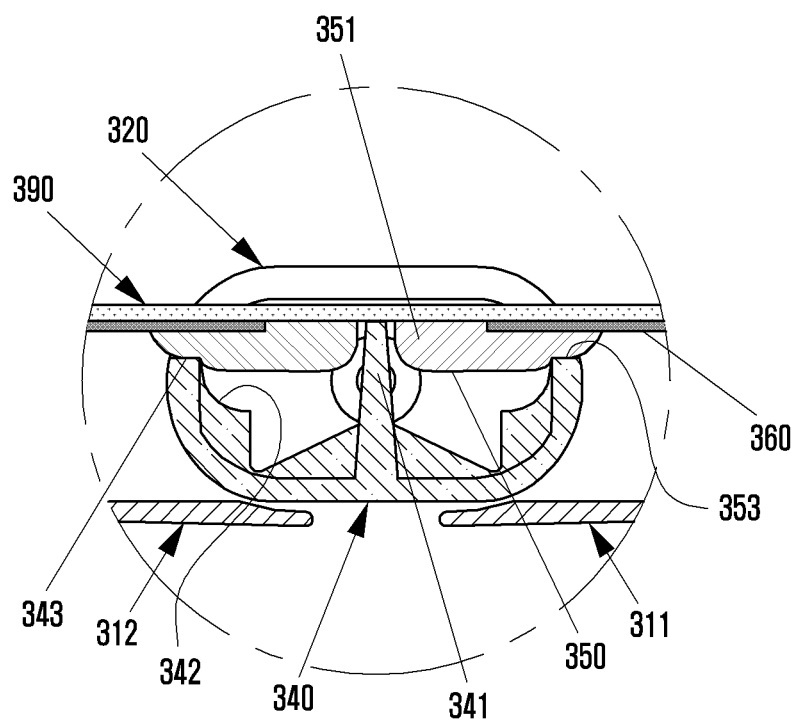

FIGS. 7A-C are diagrams illustrating the operation of the electronic device, according to the first embodiment of the present disclosure. As illustrated, the third support members 370 may be located to be spaced apart from the hinge module 320, and the first support members 350 may be located close to the hinge module 320. While the electronic device is folded (FIG. 7A), the end portions 351 of the first support members 350 may be located close to the curved slide surfaces 342. The bend 391 of the flexible display 390 may make contact with the second support members 360. The second support members 360 may be subjected to a force that the flexible display 390 applies. Since the end portions 351 of the first support members 350 are not fixed, the first support members 350 do not prevent the second support members 360 from being bent. The degree to which the second support members 360 are bent may be limited by the inner surfaces of the first and second housing members.

While the electronic device is being unfolded (FIG. 7B), the step portions 343 of the support frame 340 may come in contact with the first support members 350. The end portions 351 of the first support members 350 may approach from the curved slide surfaces 342 to the central support 341.

When the electronic device becomes unfolded (FIG. 7C), the stoppers 353 of the first support members 350 may make contact with the step portions 343 of the support frame 340. In this state, the second support members 360 and the flexible display 390 may be bent by a vertical load. When the second support members 360 are bent, the first support members 350 may move away from the central support 341. However, while the first housing member 311 and the second housing member 312 are unfolded away from each other, the step portions 343 of the support frame 340 secure the stoppers 353 of the first support members 350, thereby preventing the first support members 350 from moving.

As illustrated in FIG. 4, the hinge module 320 may include first and second hinge members 321 and 326 formed to rotate about rotation axes thereof with respect to the hinge module 320, respectively. The first housing member 311 and the second housing member 312 may be coupled to the first and second hinge members 321 and 326, respectively. Since the first housing member 311 and the second housing member 312 are coupled to the first and second hinge members 321 and 326, respectively, the first housing member 311 and the second housing member 312 may correspond to each other with respect to the hinge module 320 and may be folded toward or unfolded away from each other.

Figure 8:
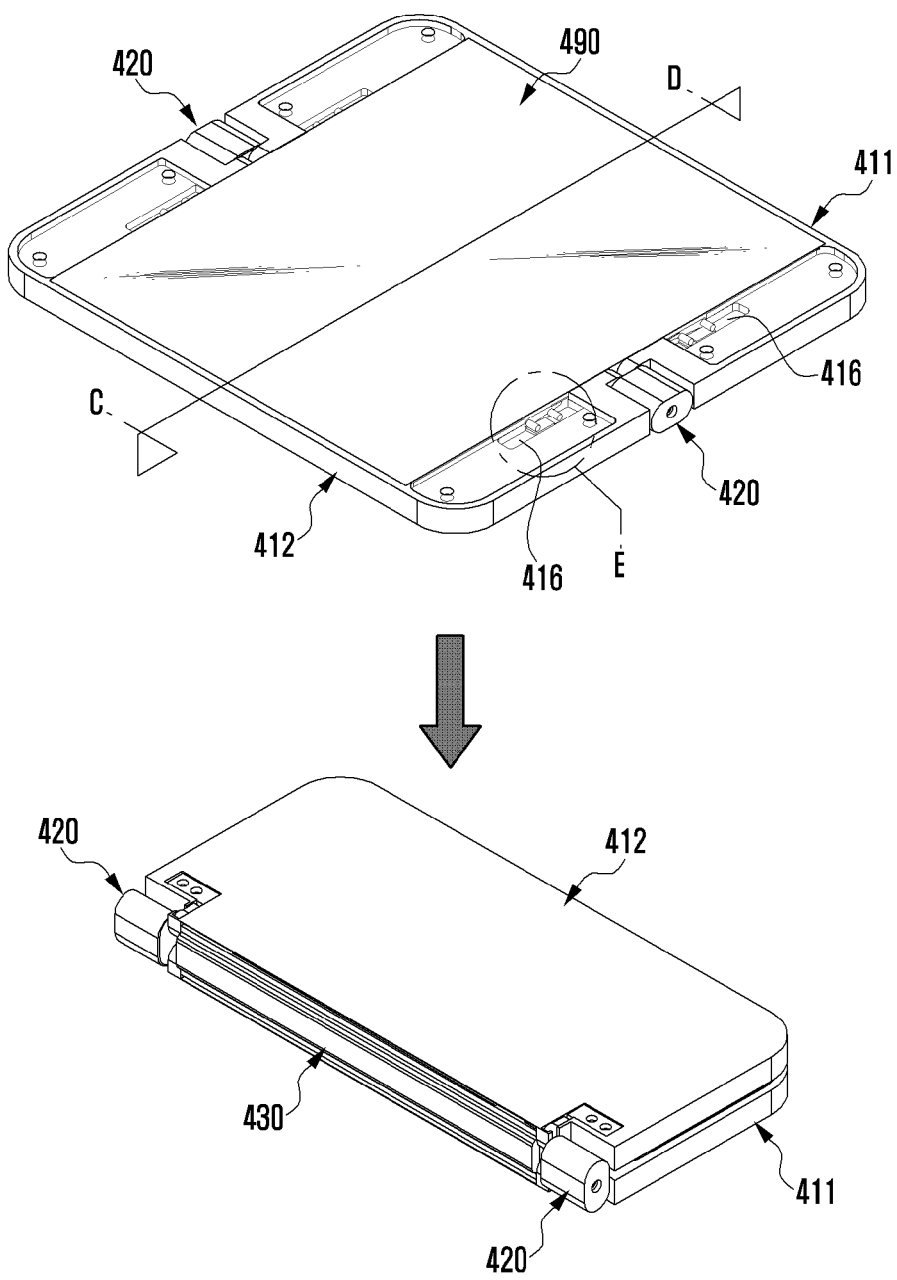
FIG. 8 is a perspective view of an electronic device according to a second embodiment of the present disclosure.
Figure 9:
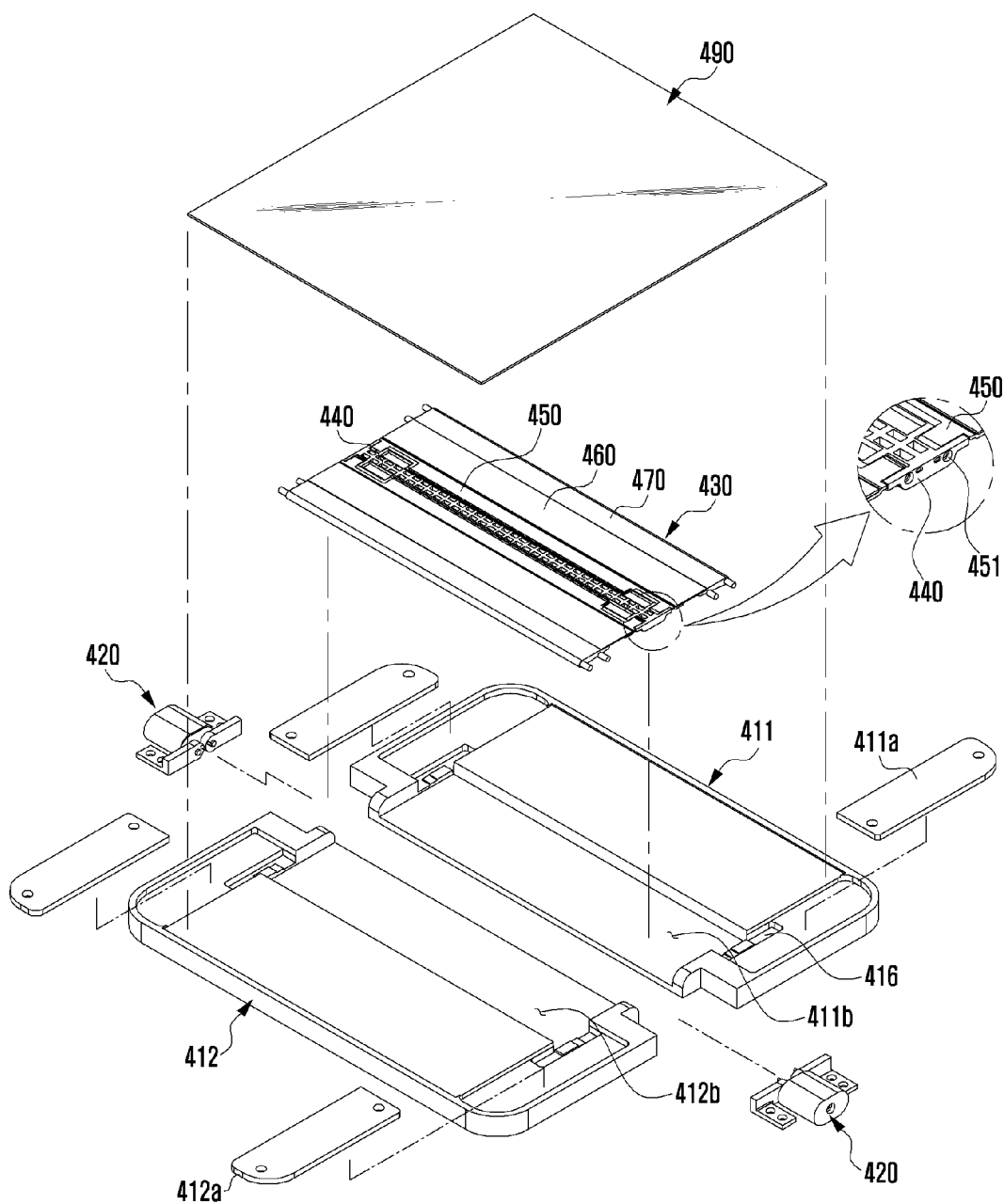
FIG. 9 is an exploded perspective view of the electronic device according to the second embodiment of the present disclosure.
Figure 10:
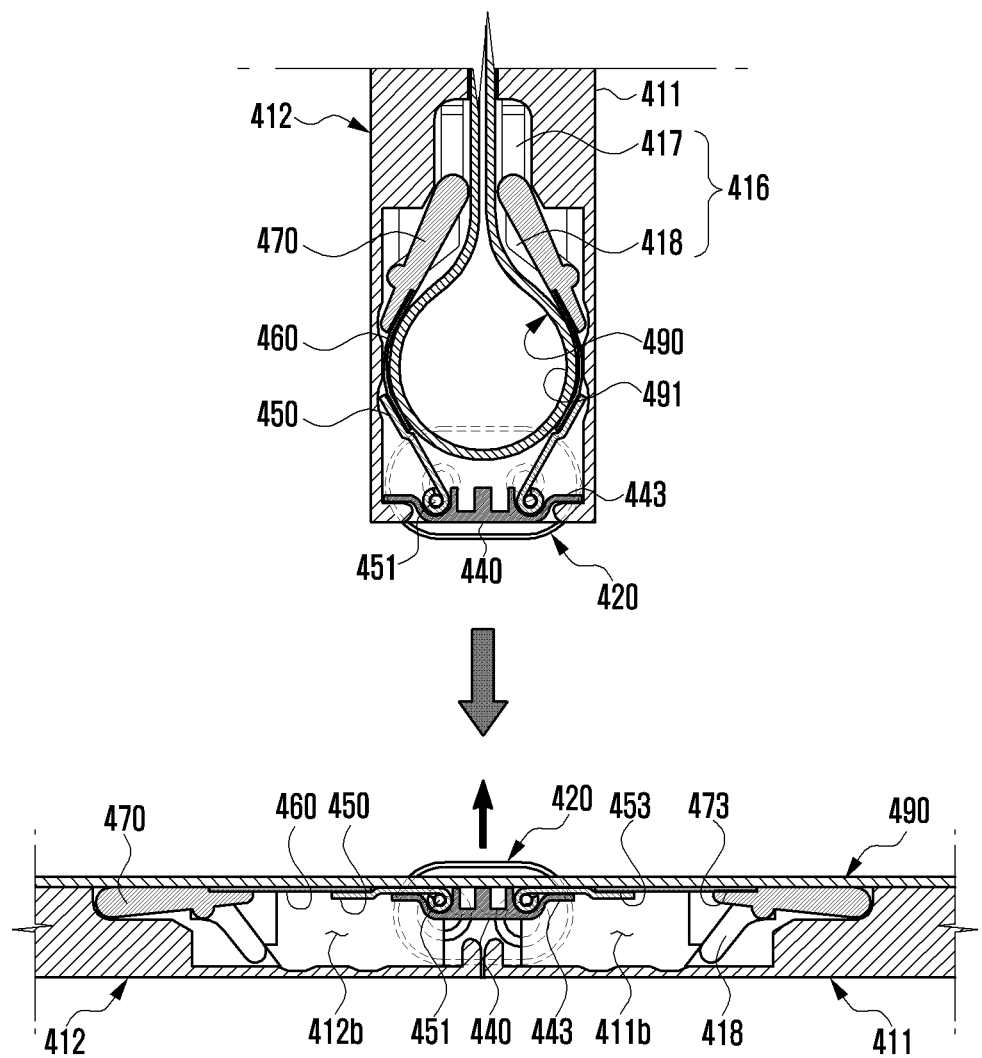
FIG. 10 is a sectional view taken along line C-D of FIG. 8.

FIG. 8 is a perspective view of an electronic device according to a second embodiment of the present disclosure. FIG. 9 is an exploded perspective view of the electronic device according to the second embodiment of the present disclosure. FIG. 10 is a sectional view taken along line C-D of FIG. 8.

The electronic device, according to the second embodiment of the present disclosure, includes a first housing member 411 and a second housing member 412 that are coupled through hinge modules 420 and adapted to pivot towards each other. A flexible display 490 may be located on a surface of the first housing member 411 and the second housing member 412.

The electronic device includes a support body 430, and the support body 430 may be disposed such that the flexible display 490 is located on one surface thereof and the first and second housing members are located on the opposite surface thereof. The support body 430 may support the flexible display 490.

The hinge modules 420 may be coupled to one side of the support body 430 and the opposite side thereof opposite to the one side, respectively. The first housing member 411 and the second housing member 412 may be coupled to the hinge modules 420 in a manner that permits them to pivot towards one another.

The support body 430 may include first support members 450, second support members 460, and third support members 470. The first support members 450 are coupled to a support frame 440 having opposite longitudinal ends coupled to the hinge modules 420. Each of the second support members 460 is coupled, at one lateral end thereof, to the corresponding first support member 450, and each of the third support members 470 is coupled to the opposite lateral end of the corresponding second support member 460.

The first support members 450, the second support members 460, and the third support members 470 may be symmetrically located on opposite lateral ends of the support frame 440. That is, the first support members 450 may be coupled to the opposite lateral ends of the support frame 440, respectively.

The first support members 450 may be coupled to the support frame 440 through pin-joint coupling parts 451 each of which is offset by a predetermined distance from the center of the support frame 440. Through the pin-joint coupling, the first support members 450 may freely rotate in one direction with respect to the support frame 440. Stoppers 443 formed between the opposite lateral ends of the support frame 440 and the pin-joint coupling parts 451 may restrict the rotation of the first support members 450, as shown. Thus, the first support members 450 may have a limited range of rotation due to the stoppers 443 of the support frame 440.

Each of the second support members 460 may be located between the first support members 450 and the third support members 470 and may be coupled, at the opposite lateral ends thereof, to the first and third support members. In some implementations, the second support member 460 may be plate-shaped. Additionally or alternatively, in some implementations, the second support member 460 may be formed of an elastic material.

While the electronic device is unfolded, one surface formed by the first to third support members 450, 460, and 470 may support the rear surface of the flexible display 490.

While the electronic device is folded, the second support member 460 may bend to support a bend 491 of the flexible display 490.

The first support 450, the second support member 460, and the third support member 470 may be located in sequence.

The third support member 470 may further include a step 473 to which the second support member 460 is coupled. The step 473 of the third support member 470 may be formed to have a height equal to the thickness of the second support member 460 so that the second support member 460 and the third support member 470 may be coplanar with each other. The first support member 450 and the second support member 460 may also be coplanar with each other by a step 453. While the electronic device is unfolded, the flexible display 490 may be supported by one surface formed by the support members 450, 460, and 470.

The third support members 470 may include outer bosses 471 and inner bosses 472 that protrude from opposite longitudinal ends thereof. Among the outer bosses 471 and the inner bosses 472, the inner bosses 472 may be located closer to the second support members 460.

A guide section 416 for guiding the movement of the third support member 470 may be formed on inner surfaces of the first housing member 411 and the second housing member 412. The guide section 416 may be formed in the bodies of the first housing member 411 and the second housing member 412.

Figure 11:
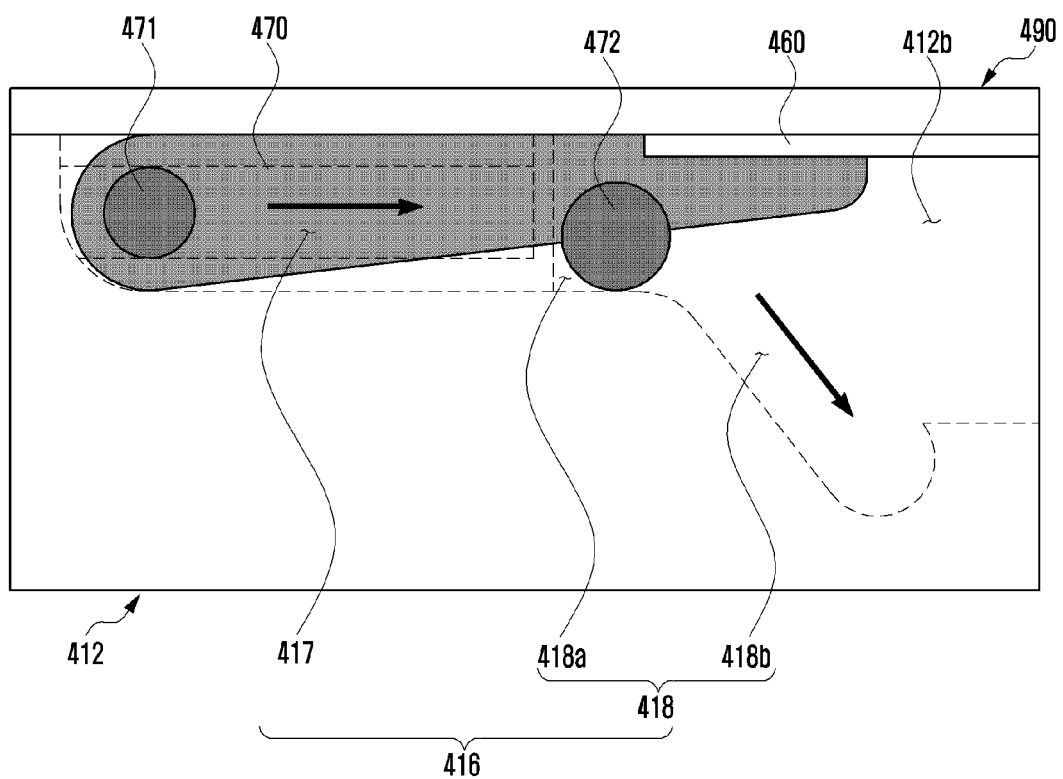
FIG. 11 is a fragmentary sectional view illustrating region E of FIG. 8 while the electronic device is unfolded, according to the second embodiment of the present disclosure.
Figure 12:
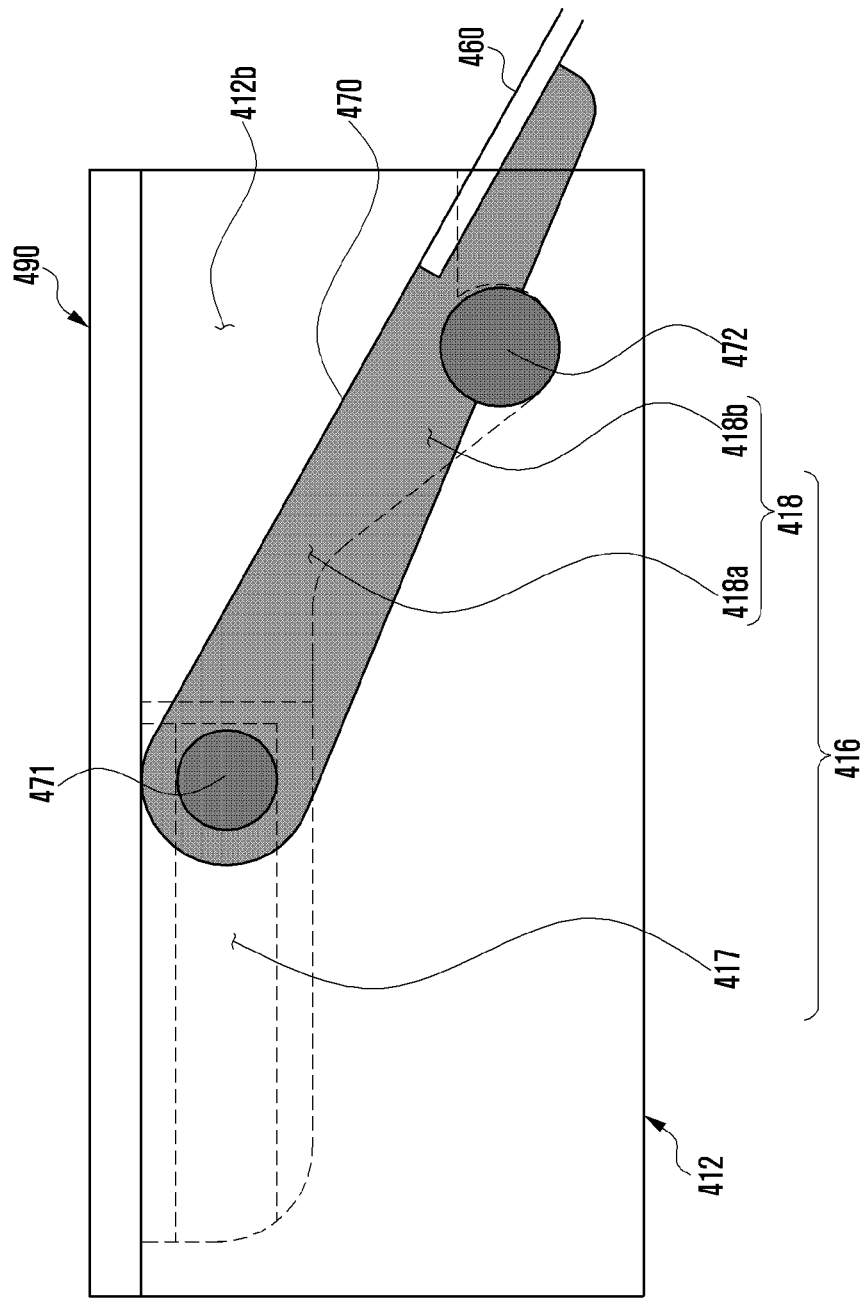
FIG. 12 is a fragmentary sectional view illustrating region E of FIG. 8 while the electronic device is folded, according to the second embodiment of the present disclosure.

FIG. 11 is a fragmentary sectional view illustrating region E of FIG. 8 while the electronic device is unfolded, according to the second embodiment of the present disclosure. FIG. 12 is a fragmentary sectional view illustrating region E of FIG. 8 while the electronic device is folded, according to the second embodiment of the present disclosure.

Although the guide section 416 formed in an inner surface of the second housing member 412 is illustrated in FIG. 11, the guide section 416 may be formed on inner surfaces located on the opposite sides of the first housing member 411 and the second housing member 412. In some implementations, as illustrated in the example of FIG. 8, at least four guide sections 416 may be formed in the electronic device. The inner surfaces of the first housing member 411 and the second housing member 412 may be located to be separated a predetermined distance inward from the lateral ends of the first housing member 411 and the second housing member 412.

Each of the guide sections 416 may include an outer path groove 417 for guiding a respective one of the outer bosses 471 such that the outer boss 471 is inserted thereinto and moves in a predetermined range and an inner path groove 418 for guiding a respective one of the inner bosses 472 such that the inner boss 472 is inserted thereinto and moves in a predetermined range.

The inner path groove 418 may include a linear section 418*a* and an inclined section 418*b* extending from the linear section 418*a*. The exterior path groove 417 may only include a linear section.

The outer boss 471 may move within a predetermined length of the outer path groove 417 and may be coupled to the outer path groove 417 to freely rotate with respect to the outer path groove 417. Since the movement of the inner boss 472 is restricted by the guide section 416, the outer boss 471 may rotate with respect to the exterior path groove 417 in a predetermined range of acute angles.

The inner boss 472 may move between the linear section 418*a* and the inclined section 418*b* of the inner path groove 418.

FIG. 11 depicts section E of the electronic device when the electronic device is unfolded, and FIG. 12 depicts section of the electronic device when the electronic device is folded.

When the electronic device is unfolded, the inner boss 472 may be located in the linear section 418*a* of the inner path groove 418, whereas when the electronic device is folded, the inner boss 472 may be located in the inclined section 418*b* of the inner path groove 418.

While the electronic device is being folded (or unfolded), the outer boss 471 may move within a predetermined range along the outer path groove 417. The inner boss 472 may move in a predetermined range through the linear section 418*a* and the inclined section 418*b* of the inner path groove 418.

The third support member 470 may move within a predetermined distance and rotate about the outer boss 471 in a predetermined range of acute angles. The second support member 460 may be moved by the guide section 416 along a predetermined path in a space between the housings 411, 412 and the flexible display 490.

FIG. 10 is a sectional view taken along line C-D of FIG. 8 and illustrates a portion of the electronic device when the electronic device is folded and unfolded.

As illustrated, when the electronic device is folded, the bend 491 may be formed in the flexible display 490. When the bend 491 applies a force to the second support members 460, the second support members 460 may also bend. At this time, the first support members 450 may rotate by a predetermined angle since the first support members 450 are jointly coupled to the support frame 440 through the pin-joint coupling parts 451. However, since the first support members 450 are coupled to the support frame 440 through the pin-joint coupling, the first support members 450 is restricted by the range in which the support frame 440 moves. That is, the first support members 450 may be coupled to the support frame 440 through pin-joint coupling to rotate only in one direction with respect to the support frame 440. The support frame 440 may move in a predetermined range with respect to the hinge modules 420. As the support frame 440 moves, the pin-joint coupling parts 451 of the first support members 450 may move.

Although the third support members 470 have to move in a predetermined range, the third support members 470 are less limited in the moving range than the first support members 450. Accordingly, while the electronic device is folded, the third support members 470 have a larger moving range than the first support members 450. Since the outer boss 471 and the inner boss 472 move along the outer path groove 417 and the inner path groove 418, respectively, the third support member 470 moves along a predetermined path. Receiving spaces 411*b* and 412*b* for receiving the bend 491 and the support body 430 are required inside the housing of the electronic device. With the receiving spaces 411*b* and 412*b* minimized, the internal spaces of the first housing member 411 and the second housing member 412 may be minimized.

When the support frame 440 is spaced apart from the bend 491 of the flexible display 490, the support members 450, 460, and 470 may at least in part conform to the surface of the bend 491. If the support frame 440 approaches the bend 491, the second support members 460 are more bent than illustrated in FIG. 10, and the first support member 450 and third support member 470 are much more inclined. That is, more internal spaces in the first housing member 411 and the second housing member 412 are required to make the first and third support members more inclined. In this case, the first housing member 411 and the second housing member 412 are required to be thick. That is, in order to minimize the internal spaces of the first housing member 411 and the second housing member 412, the support frame 440 may be spaced apart from the bend 491 while the electronic device is folded. In other words, since the support frame 440 may be spaced apart from the bend 491, it is possible to minimize the receiving spaces 411*b* and 412*b* for receiving the bend 491.

When the electronic device is unfolded, the support members 450, 460, and 470 may be aligned to form a substantially flat surface that is adapted to support the flexible display 490. In addition, the support frame 440 may also support the flexible display 490. The bend 491 of the flexible display 490 may be straightened to be flat. While the bend 491 is straightened, the entire region of the flexible display 490 may be supported. In cases where only one portion of the flexible display 490 is supported, the flexible display 490 may be bent at the unsupported portion thereof when being used (e.g., when a user views a display or inputs a touch), thereby causing user inconvenience in using the electronic device.

The support frame 440, although spaced apart from the bend 491, may make contact with the flexible display 490 in a state in which the bend 491 is straightened to be flat. The support frame 440 may move upward or downward while the electronic device is being folded or unfolded.

Figure 13:
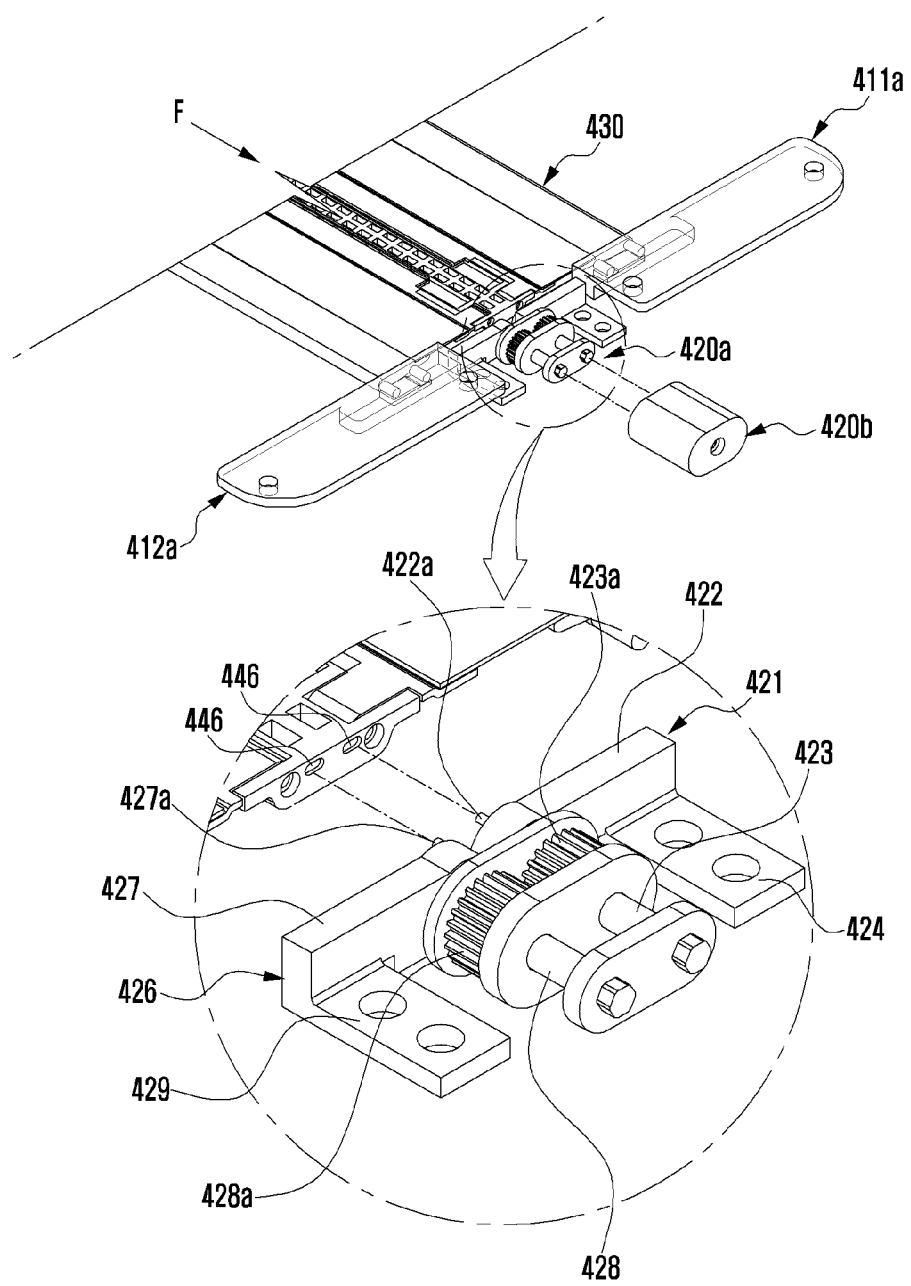
FIG. 13 is a perspective view of a hinge module of the electronic device according to the second embodiment of the present disclosure.
Figure 14:
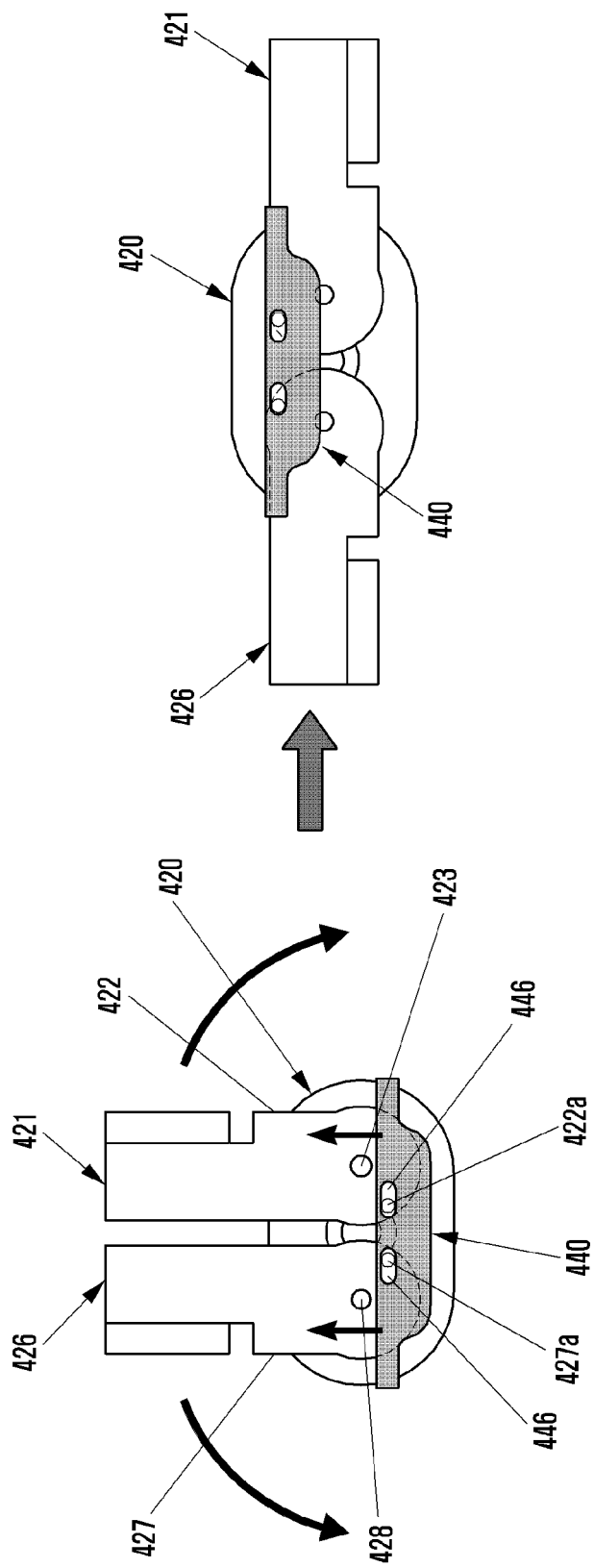
FIG. 14 illustrates the hinge module when viewed from a direction F of FIG. 13.

FIG. 13 is a perspective view of the hinge module 420 of the electronic device according to the second embodiment of the present disclosure. FIG. 14 illustrates the hinge module 420 when viewed from a direction F of FIG. 13.

The guide sections 416 may be integrally formed in the first housing member 411 and the second housing member 412 as illustrated in FIG. 9, or may be formed in separate fixing pieces 411a and 412a for preventing the separation of the third support members 470 as illustrated in FIG. 13.

The hinge module 420 may include a hinge body 420a that makes up the body of the hinge module 420, and a hinge case 420b.

The hinge body 420a may include a first hinge member 421 and a second hinge member 426. The first hinge member 421 includes a rotating shaft 423 having a rotating gear 423a formed thereon, and the second hinge member 426 includes a rotating shaft 428 having a rotating gear 428a formed thereon, which is engaged with the rotating gear 423a of the first hinge member 421.

The first hinge member 421 and the second hinge member 426 may rotate about the rotating shafts 423 and 428 thereof, respectively.

Since the rotating gear 423a of the first hinge member 421 and the rotating gear 428a of the second hinge member 426 are engaged with each other, the first hinge member 421 and the second hinge member 426 may rotate to correspond to each other. The first housing member 411 and the second housing member 412 may be coupled to housing fixing parts 424 and 429 of the first hinge member 421 and the second hinge member 426, respectively. Since the first housing member 411 and the second housing member 412 are coupled to the first and second hinge members, respectively, the first housing member 411 and the second housing member 412 may pivot towards (or away from) one another.

The first hinge member 421 and the second hinge member 426 may include rotating bodies 422 and 427, respectively, which are formed on end portions of the rotating shafts 423 and 428, and the rotating bodies 422 and 427 may include rotating protrusions 422a and 427a, respectively, which protrude toward the support frame 440.

Slide recesses 446 into which the rotating protrusions 422a and 427a are inserted may be formed on an end portion of the support frame 440.

As the rotating bodies 422 and 427 rotate in the rotation directions of the rotating shafts 423 and 428, the rotating protrusions 422a and 427a may rotate in the rotation directions of the rotating shafts 423 and 428. At this time, the rotating protrusions 422a and 427a may slide in the slide recesses 446, and the support frame 440 may be moved by the hinge module 420 to be brought into contact with or spaced apart from the flexible display 490.

Referring to FIG. 14, while the electronic device is unfolded, the support frame 440 may be moved by the hinge module 420 to come in contact with the flexible display 490.

Referring to FIG. 14, in the process in which the first housing member 411 and the second housing member 412 are folded toward each other, the support frame 440 may be moved by the hinge module 420 to be spaced apart from the flexible display 490.

The rotating protrusions 422a and 427a protrude from the rotating bodies 422 and 427, respectively, while being offset from the centers of the rotating shafts 423 and 428. The rotating protrusion 422a or 427a may be located on one surface of the rotating body 422 or 427, and the rotating shaft 423 or 428 may be located on the opposite surface of the rotating body 422 or 427.

The rotating bodies 422 and 427 may rotate about the rotating shafts 423 and 428, respectively, and the rotating protrusions 422a and 427a may revolve around the rotating shafts 423 and 428, respectively. Since the rotating protrusions 422a and 427a revolve around the rotating shafts 423 and 428, the rotating protrusions 422a and 427a may move upward and downward with respect to the rotating shafts 423 and 428. The movement of the rotating protrusions 422a and 427a may allow the support frame 440 to move upward and downward. That is, the first hinge member 421 and the second hinge member 426, while rotating, may cause the support frame 440 to approach or move away from the flexible display 490. Since the first hinge member 421 and the second hinge member 426 are coupled to the first housing member 411 and the second housing member 412, respectively, the support frame 440 may approach or move away from the flexible display 490 while the first housing member 411 and the second housing member 412 are being folded toward or unfolded away from each other.

As described above, the electronic device, according to the various embodiments of the present disclosure, can prevent the deflection or flexure of the flexible display that may occur while the electronic device is being used in an unfolded state, and can bend the flexible display and receive the same therein when the electronic device is folded.

FIGS. 1-14 are provided as an example only. It will be understood that the provision of the examples described herein, as well as clauses phrased as "such as," "e.g.", "including", "in some aspects," "in some implementations," and the like should not be interpreted as limiting the claimed subject matter to the specific examples.

Any of the functions and steps provided in the Figures may be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, or a combination hardware configured with machine executable code and may be performed in whole or in part within the programmed instructions of a computer.

No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device comprising:
a flexible display;
a first housing member;
a second housing member;
a hinge module coupled to the first housing member and the second housing member; and
a support body disposed between the flexible display and the first and second housing members,
wherein the second housing member that pivots about the hinge module relative to the first housing member;
wherein the support body forms a substantially flat surface that provides support to the flexible display when the electronic device is unfolded,
wherein the support body comprises:
a support frame coupled to the hinge module;
a first support member coupled to the support frame via a pin-joint coupling part;
a second support member coupled to the first support member; and
a third support member coupled to the second support member, and
wherein the third support member comprises an inner boss and an outer boss, the inner and outer boss extending in a lateral direction from the third support member, and the first housing member comprises a guide section that is arranged to guide the inner boss away from the flexible display.

2. The electronic device of claim 1, wherein:
the guide section comprises an inner path groove that includes a first section having a first longitudinal axis and a second section having a second longitudinal axis that is transverse to the first longitudinal axis,
the inner boss is arranged to travel along the first and second longitudinal axes when the electronic device is being opened or closed,
the inner boss is disposed in the first section when the electronic device is unfolded, and
the inner boss is disposed in the second section of the inner path groove, when the electronic device is folded.

3. The electronic device of claim 2, wherein the guide section comprises an outer path groove and the outer boss moves along the outer path groove when the electronic device is being folded or unfolded.

4. An electronic device comprising:
a flexible display;
a first housing member;
a second housing member;
a hinge module coupled to the first housing member and the second housing member; and
a support body disposed between the flexible display and the first and second housing members,
wherein the second housing member that pivots about the hinge module relative to the first housing member;
wherein the support body forms a substantially flat surface that provides support to the flexible display when the electronic device is unfolded;
wherein the support body comprises:
a support frame coupled to the hinge module;
a first support member coupled to the support frame via a pin-joint coupling part;
a second support member coupled to the first support member; and
a third support member coupled to the second support member; and
wherein the support frame includes a stopper formed at one end of the support frame that restricts a rotation of the first support member about the pin-joint coupling part,
the hinge module further comprises a first hinge member and a second hinge member,
the first hinge member includes a first rotating body and a first rotating shaft, the first rotating shaft having a first rotating gear disposed thereon,
the second hinge member includes a second rotating body and a second rotating shaft, the second rotating shaft having a second rotating gear disposed thereon that is engaged with the first rotating gear,
the first rotating body includes a first rotating protrusion that is mated with a first slide recess formed in the support frame, and
the second rotating body includes a second rotating protrusion that is mated with a second slide recess formed in the support frame.

5. The electronic device of claim 4, wherein when the first rotating body rotates, the first rotating protrusion slides in the first slide recess while rotating around the first rotating shaft.

6. The electronic device of claim 4, wherein:
the support frame is caused by the hinge module to come in contact with the flexible display when the electronic device is unfolded, and
the support frame is caused by the hinge module to become separated from the flexible display when the electronic device is folded.

* * * * *